United States Patent [19]

Von Sacken

[11] Patent Number: 5,180,574
[45] Date of Patent: Jan. 19, 1993

[54] HYDRIDES OF LITHIATED NICKEL DIOXIDE AND SECONDARY CELLS PREPARED THEREFROM

[75] Inventor: Ulrich Von Sacken, Port Coquitlam, Canada

[73] Assignee: Moli Energy (1990) Limited, Canada

[21] Appl. No.: 828,772

[22] Filed: Jan. 30, 1992

Related U.S. Application Data

[63] Continuation-in-part of Ser. No. 556,764, Jul. 23, 1990.

[51] Int. Cl.$^5$ .............................................. C01B 6/24
[52] U.S. Cl. ........................ 423/594; 423/593; 429/223; 429/221; 429/224
[58] Field of Search ........................... 423/593–594; 429/221, 223, 224, 218

[56] References Cited

U.S. PATENT DOCUMENTS

| | | | |
|---|---|---|---|
| 4,302,518 | 11/1981 | Goodenough et al. | 429/194 |
| 4,567,031 | 1/1986 | Riley | 423/593 |
| 4,980,080 | 12/1990 | Lecerf et al. | 252/182 |

FOREIGN PATENT DOCUMENTS

| | | |
|---|---|---|
| 243926 | 4/1987 | European Pat. Off. |
| 63-19761 | 1/1988 | Japan |
| 63-121260 | 5/1988 | Japan |

OTHER PUBLICATIONS

Dyer et al., *JACS*, 76, 1499–1503 (1954).
Bronger et al., *Z. Anorg. Allg. Chem.*, 333, 188–200 (1956).
Goodenough et al., *J. Phys. Chem. Solids*, 5, 107–16 (1958).
Goodenough et al., *J. App. Phys.*, 29(3), 382–3 (1958).
Fensham, *JACS*, 76, 969–71 (1954).

*Primary Examiner*—R. Bruce Breneman
*Attorney, Agent, or Firm*—Lerner, David, Littenberg, Krumholz & Mentlik

[57] ABSTRACT

Hydrides of lithiated nickel dioxide are disclosed, prepared by providing a substantially homogeneous dry intermediate mixture of a starting material containing a nickel compound selected from nickel oxide, nickel hydroxide and mixtures thereof, and optionally including one or more oxides or hydroxides of a transition metal selected from cobalt, iron, chromium, titanium, manganese and vanadium, together with about a 25% stoichiometric excess of lithium hydroxide. The mixture is heat-treated at a temperature above about 600° C. in an atmosphere having a partial pressure of water vapor greater than about two torr. Electrochemical cells are also disclosed, incorporating the disclosed hydrides as a cathode-active material.

68 Claims, 2 Drawing Sheets

HYDRIDES OF LITHIATED NICKEL DIOXIDE AND SECONDARY CELLS PREPARED THEREFROM

This is a continuation-in-part of U.S. patent application Ser. No. 556,754, filed Jul. 23, 1990, the disclosure of which is hereby incorporated herein by reference thereto.

BACKGROUND OF THE INVENTION

The present invention relates to hydrides of lithiated nickel dioxide having X-ray diffraction patterns essentially equivalent to lithiated nickel dioxide having a hydrogen-free crystal lattice. Secondary electrochemical cells incorporating hydrides of lithiated nickel dioxide as the cathode-active material are also disclosed, which demonstrate a significant increase in reversible capacity compared to cells incorporating as the cathode-active material lithiated nickel dioxide having a hydrogen-free crystal lattice. Methods of preparing the hydrides of lithiated nickel dioxide of the present invention are also disclosed.

Electrochemical cells useful as electrical storage batteries usually incorporate a metal-containing anode and a cathode including an active material which can take up ions of the metal. An electrolyte incorporating ions of the metal is disposed in contact with the anode and the cathode. During discharge of the cell, metal ions leave the anode, enter the electrolyte and are taken up in the active material of the cathode, resulting in the release of electrical energy. Provided that the reaction between the metal ions and the cathode-active material is reversible, the process can be reversed by applying electrical energy to the cell. If such a reversible cathode-active material is provided in a cell having the appropriate physical configuration and an appropriate electrolyte, the cell can be recharged and reused. Rechargeable cells are commonly referred to in the battery art as "secondary" cells.

It has long been known that useful secondary cells can be made using a light alkaline metal such as sodium, potassium and particularly, lithium, as the source of the metal ions exchanged between the anode and cathode through the electrolyte. These metals are particularly useful in combination with a cathode-active material that is a sulfide or oxide of a transition metal, i.e., a metal capable of assuming plural different valence states. In the past, these alkaline metals such as lithium have been used in electrochemical cells in their pure metal state as the cell anode in combination with the transition metal cathode-active material. See, for example, Dampier, *J. Electrochem. Soc.*, 121(5), 656–60 (1974). It is common knowledge that water reacts with alkaline metals such as sodium, potassium and lithium in their pure metal state, reducing the suitability of these metals as electrode materials. Therefore, extreme care must be taken during cell assembly to avoid exposure of the anode metal material to ambient moisture and other sources of water.

Secondary lithium cell researchers have sought to develop a rechargeable lithium cell containing no metallic lithium. Cells have been developed using instead of a lithium metal anode, a lithium intercalation host that operates near the potential of lithium, such as the material in cells incorporating same disclosed in presently co-pending U.S. patent application Ser. No. 350,396 by Fong et al., filed May 11, 1989, which with the present application is commonly owned. The disclosure of which application is hereby incorporated herein by reference thereto.

Replacing lithium metal anodes with lithium intercalation host anodes removes some of the restrictions lithium metal anodes place upon cell design in choice of electrolytes and also the adverse effect lithium metal plating places upon cycling performance and safety in the finished cell. However, a source of lithium must still be supplied to the cell for exchange between the anode and cathode-active material through the electrolyte. This can be done by assembling cells with a sacrificial strip of lithium placed in electrical contact with the anode so that when electrolyte is added, the lithium is consumed by reacting with the intercalation host material of the anode. However, this wastes space and reduces cell capacity.

A preferred solution is to use a cathode-active material that already contains the required lithium. Lithiated nickel dioxide is considered to be a commercially feasible lithiated cathode-active material because it demonstrates sufficient reversible capacity over a voltage range of about 3 to about 4.2 volts. Lithiated nickel dioxide is also a useful cathode-active material in conventional lithium cells.

Japanese Published Patent Application No. 63-121,260 and European Patent Application Publication No. 243,926 disclose the preparation of lithiated nickel dioxide for use in lithium batteries by the solid state reaction of powdered nickel carbonates and/or oxides at temperatures in excess of 850° C. in air. Japanese Published Patent Application No. 60-74,272 discloses a nickel hydroxide coating electrochemically oxidized in a lithium hydroxide solution to obtain a "lithium doped nickel oxide" that is then heat treated at 450° C. for one hour.

U.S. Pat. No. 4,567,031 discloses a lithiated nickel dioxide for use as a cathode-active material having the formula $Li_xNi_yO_z$ wherein x is between 0.1 and 1.1, y is between 1.1 and 0.1 and z is between 1.9 and 2.1, which is prepared by co-crystallizing or co-precipitating a stoichiometric solution of an oxygen-containing lithium salt and an oxygen-containing nickel salt. The resulting mixed salt is calcined at 400°–500° C. in a stream of air or a stream of carbon monoxide and carbon dioxide. The low temperature calcination is disclosed as producing a high surface area powder. Japanese Published Patent Application No. 63-19,761 discloses the preparation of lithiated nickel dioxide by the anodic oxidation of nickel hydroxide in an aqueous solution of lithium hydroxide. The lithiated nickel hydroxide is then washed in hot water and heated at 200° C. for two hours to dry the material and drive off water to form the nickel dioxide. Lithiated nickel dioxide cathode-active material having the formula $Li_xNi_yO_2$, with x less than one and y about equal to one is also disclosed in U.S. Pat. No. 4,302,518.

Published European Patent Application Publication No. 345,707 discloses the preparation of lithiated nickel dioxide for use as a cathode-active material having the formula $Li_yNi_{2-y}O_2$ with $0.84 \leq y \leq 1.22$, made from lithium hydroxide and nickel oxide, pulverized and mixed in stoichiometric ratio and heated in air to a temperature between 600° C. and 800° C. An excess of lithium hydroxide is used to compensate for volatilization of this material at the heating temperature. The material is disclosed as being useful as a cathode-active material for secondary cells.

Electrochemical cells having lithiated nickel dioxide as the cathode-active material typically have poor cycling capacities. In addition, lithiated nickel dioxide is thermally unstable when lithium is de-intercalated upon charging of the cell. The de-intercalation forms $Li_{1-x}NiO_2$. As x increases, the nickel approaches an unstable 4+ valence, and the material releases oxygen when heated. If a charged cell is welded on the positive electrode and local heating of the de-intercalated lithiated nickel dioxide occurs, oxygen can be liberated, which oxidizes the cell electrolyte solvent, generating more heat. If the "self-heating" rate becomes high enough, the cells can undergo thermal runaway, rupture and burn. This is not only a problem during welding of the cell casing. The self-heating reaction occurs at temperatures around 100°–200° C., which can result from typical electrical or thermal abuse of the cell.

Even when care is taken not to thermally release oxygen from the lithiated nickel dioxide charged cells, there is a tendency for gaseous products to accumulate with cycling, leading to a hazardous pressure buildup. These gaseous products are formed from impurities in the lithiated nickel dioxide such as lithium hydroxide (LiOH) and lithium carbonate ($Li_2CO_3$) when the cells are charged under normal operating conditions. When sufficient levels of impurities are present, the pressure eventually accumulates to a level that actuates the pressure vent, a safety device that prevents a hazardous pressure buildup capable of bursting the cell. Nevertheless, activation of the pressure vent causes the cell to malfunction.

Parent U.S. patent application Ser. No. 556,754 discloses a lithiated nickel dioxide cathode-active material having improved cycling capacity, thermal stability and freedom from the evolution of gaseous products with cycling, compared to the existing art, having the formula $Li_xNi_{2-x-y}M_yO_2$, with x being between about 0.8 and about 1.0, M being one or more metals selected from cobalt, iron, titanium, manganese, chromium and vanadium, and y being less than about 0.2, with the proviso that y is less than about 0.5 for cobalt. The lithiated nickel dioxide disclosed is obtained by heat treating a substantially homogeneous dry intermediate mixture of a starting material containing NiO, $Ni(OH)_2$ or mixtures thereof, and optionally including one or more oxides or hydroxides of a transition metal selected from cobalt, iron, titanium, manganese, chromium and vanadium, together with about a 10% to about 25% stoichiometric excess of LiOH at a temperature above about 600° C. in an atmosphere substantially free of carbon dioxide and having a partial pressure ratio of oxygen to water vapor greater than about 15. Any LiOH or $Li_2CO_3$ present is then removed from the heated mixture so that the lithiated nickel dioxide is substantially free of LiOH and $Li_2CO_3$ The excess of LiOH ensures that x for Li will be between about 0.8 and about 1.0. The use of an atmosphere substantially free of carbon dioxide and having a partial pressure ratio of oxygen to water vapor greater than about 15 minimizes the formation of LiOH and $Li_2CO_3$, which are not cathode-active, and which also scavenge lithium from the reaction mixture, thus depressing the value of x for Li. Furthermore, LiOH and $Li_2CO_3$, when present in lithiated nickel dioxide, decompose electrochemically at high cell voltages. The LiOH generates oxygen, hydrogen and hydrogen peroxide, and the $Li_2CO_3$ generates carbon dioxide and oxygen. These predominantly gaseous products lead to pressure buildup in the cells that eventually results in cell malfunction. By minimizing the formation of LiOH and $Li_2CO_3$ and removing any LiOH and $Li_2CO_3$ present, not only is the value of x for Li maximized, the accumulation of gaseous products causing pressure buildup in cells is significantly reduced to the point of elimination.

Parent U.S. patent application Ser. No. 556,754 discloses that any LiOH and $Li_2CO_3$ that does form are preferably removed by a controlled water extraction, which must be done with care because hydrogen can replace the lithium in $Li_xNi_{2-x-y}M_yO_2$ to make $Li_{x-z}H_zNi_{2-x-y}M_yO_2$. This application discloses that the displacement of lithium by hydrogen is not favored because the lithium is removed from the crystal lattice and replaced by hydrogen. The hydrogen is not exchanged between the cathode and the anode like the lithium. This application discloses that $Li_{x-z}H_zNi_{2-x-y}M_yO_2$ having z less than about 0.02 works well as a cathode-active material.

While the lithiated nickel dioxide cathode-active materials disclosed by parent U.S. patent application Ser. No. 556,754 have improved cycling capacity, thermal stability and freedom from the evolution of gaseous products with cycling, compared to the existing art, the cycling capacity remains somewhat marginal in the context of commercial feasibility. Therefore, a need exists for a lithiated nickel dioxide cathode-active material having improved cycling capacity, yet possessing thermal stability and freedom from the evolution of gaseous products with cycling possessed by the lithiated nickel dioxide cathode-active materials of parent U.S. patent application Ser. No. 556,754.

SUMMARY OF THE INVENTION

It has now been unexpectedly discovered that the incorporation of hydrogen into the lithiated nickel dioxide crystal lattice in amounts that do not disrupt the lattice structure significantly and surprisingly improves the cycling capacity of this cathode-active material over hydrogen-free lithiated nickel dioxide. In particular, for lithiated nickel dioxide cathode-active materials in the form of a hydride having the formula $Li_{x-z}H_zNi_{2-x-y}M_yO_2$, with x being between about 0.8 and about 1.0, M being one or more metals selected from cobalt, iron, titanium, manganese, chromium and vanadium, and y being less than about 0.2, with the proviso that y is less than about 0.5 for cobalt, improved cycling capacity over hydrogen-free lithiated nickel dioxide can be obtained with values of z for hydrogen as high as 0.3.

The hydride can be prepared in accordance with the process disclosed by parent U.S. patent application Ser. No. 556,754, provided that the intermediate mixture of the parent application is heat treated in an atmosphere having a partial pressure of water vapor above about two torr. This is accomplished by either first performing the heat treating step of the process disclosed in the parent application in which a drying atmosphere is utilized, followed by a heat treating step at a temperature between about 600° C. and 700° C. utilizing an atmosphere having a partial pressure of water vapor above about two torr, or by replacing the heat treating step of the parent application with a heat treating step at a temperature between about 600° C. and 700° C. utilizing an atmosphere having a partial pressure of water vapor above about two torr.

The hydride can also be prepared by rinsing lithiated nickel dioxide with water. Prior to rinsing, the lithiated nickel dioxide may be prepared by heat treating the starting materials in a drying atmosphere, as disclosed by the parent application, or by heat treating in a moist atmosphere, as disclosed in the present application. However, if water rinsing is used to produce the hydride, heat treating the lithiated nickel dioxide in a moist atmosphere is not necessary because the ion exchange that occurs during the rinse introduces more than enough hydrogen into the lattice.

By means of any of these methods, a hydride of lithiated nickel dioxide is obtained which is suitable for use as a cathode-active material that can also be rendered substantially free of LiOH and $Li_2CO_3$, by preventing the formation of $Li_2CO_3$ and by converting any LiOH formed to $Li_2O$, an electrochemically inert impurity. The hydride of lithiated nickel dioxide of the present invention can therefore also be provided with desirable thermal stability and freedom from the evolution of gaseous products with cycling like the lithiated nickel dioxide disclosed by the parent application.

Because the improved cycling capacity of the hydride of lithiated nickel dioxide of the present invention is maintained when up to about 20% of the nickel is replaced by one or more transition metals selected from cobalt, iron, chromium, titanium, manganese and vanadium, and when up to about 50% of the nickel is replaced by cobalt, for purposes of this disclosure, all lithiated nickel dioxides, including those in which a portion of the nickel has been replaced by one or more transition metals, are hereinafter referred to as lithiated nickel dioxides.

One aspect of the present invention therefore provides a hydride of lithiated nickel dioxide having a formula $Li_{x-z}H_zNi_{2-x-y}M_yO_2$ with x being between about 0.8 and about 1.0, y being less than about 0.2, z being less than about 0.3 and M being one or more metals selected from cobalt, iron, chromium, titanium, manganese and vanadium, with the proviso that y is less than about 0.5 for cobalt. In accordance with another embodiment of this aspect of the present invention, the hydride of lithiated nickel dioxide is preferably substantially free of LiOH and $Li_2CO_3$.

As noted above, the hydride of lithiated nickel dioxide is prepared by either replacing the heat treating step of the parent application with a heat treating step utilizing an atmosphere having a partial pressure of water vapor above about two torr or by employing such a heat treating step after the heat treating step of the parent application. To obtain a hydride of lithiated nickel dioxide substantially free of LiOH and $Li_2CO_3$, the atmosphere utilized in either heat-treating step is substantially free of carbon dioxide to minimize the formation of $Li_2CO_3$, and has a partial pressure ratio of oxygen to water vapor greater than about 15, to minimize the formation of LiOH.

It has further been discovered that increasing the partial pressure of oxygen above the ambient level has a beneficial effect in that it accelerates the synthesis reaction. In view of the fact that the partial pressure of oxygen in ambient air is about 160 torr, and that the partial pressure of water vapor utilized should be above about two torr, partial pressure ratios of oxygen to water vapor in accordance with this embodiment of this aspect of the present invention of 80, and greater are suitable for use with the present invention. By being substantially free of LiOH and $Li_2CO_3$, the resulting hydride of lithiated nickel dioxide is thermally stable and does not evolve gaseous products with cycling.

In accordance with still yet another embodiment of this aspect of the present invention, the hydride of lithiated nickel dioxide preferably has a Brunauer-Emmett-Teller (BET) surface area of less than 3.0 $m^2/g$. This is accomplished by heating the intermediate mixture to temperatures above about 650° C. Controlling the surface area of the cathode-active material in this manner has been found to be a very effective method of reducing the oxidation of the electrolyte by the cathode-active material when cells become overheated as a result of electrical or thermal abuse. The resulting hydride of lithiated nickel dioxide has improved thermal stability and reduced oxygen evolution during cycling because the decreased surface area hinders the liberation of oxygen from the lithiated nickel dioxide so that longer heating times and higher temperatures are required to generate a quantity of oxygen sufficient to oxidize the electrolyte solvent.

However, while temperatures greater than 700° C. maximize the reduction of the surface area, such temperatures interfere with the formation of the hydride, even when the partial pressure of water vapor in the heat-treatment atmosphere exceeds two torr. Methods that accomplish reduction of surface area and the formation of the hydride include longer heating times at temperatures below 700° C. but at a temperature sufficient to form the hydride and in an atmosphere having a partial pressure of water vapor above about two torr; or first heating at temperatures greater than 700° C. to reduce the surface area, and the reheating at a temperature below 700° C. in an atmosphere having a partial pressure of water vapor above about two torr to form the hydride; or forming the hydride by water-rinsing lithiated nickel dioxide synthesized at temperatures above about 700° C.

While not being bound by any particular theory, it is believed that the improved cycling capacity of the lithiated nickel dioxide cathode-active materials of parent U.S. patent application No. 556,754 can be attributed to the presence of small quantities of hydrogen in the lattice structure of the cathode-active material. The minimizing of the formation of LiOH and $Li_2CO_3$ and the removing of any LiOH and $Li_2CO_3$ present is believed to reduce the pressure buildup resulting from the decomposition of these impurities when the cells are charged. The reduction of the surface area of the cathode-active material contributes to the thermal stability of the cell by minimizing the liberation of oxygen from the lithiated nickel dioxide when the cells are overheated from electrical or thermal abuse.

As noted above, the hydride of lithiated nickel dioxide of the present invention can be prepared by the process disclosed by parent U.S. patent application Ser. No. 556,754; however, the intermediate mixture is heat treated in an atmosphere having a partial pressure of water vapor above about two torr. Therefore, another aspect of the present invention provides a method of making a hydride of lithiated nickel dioxide having the formula $Li_{x-z}H_zNi_{2-x-y}M_yO_2$, wherein x, y and M are as described above and z is less than about 0.02, which method includes the steps of providing a substantially homogeneous dry, intermediate mixture of a starting material containing $Ni(OH)_2$, NiO or mixtures thereof, and optionally including one or more transition metal compounds selected from hydroxides and oxides of cobalt, iron, chromium and vanadium, together with up to about a 25% stoichiometric excess of LiOH, and heating the mixture at a temperature above about 600°

C. in an atmosphere having a partial pressure of water vapor above about two torr.

The quantity of hydrogen incorporated into the lithiated nickel dioxide by heating the intermediate mixture in an atmosphere having a partial pressure of water vapor greater than about two torr is limited. As noted above, this embodiment of this aspect of the present invention provides a hydride of lithiated nickel dioxide suitable for use as a cathode-active material having a value for z of less than about 0.02.

Therefore, another embodiment of this aspect of the present invention provides a hydride of lithiated nickel dioxide in accordance with the above-described formula in which z is greater than 0.02 and less than about 0.3. Processes in accordance with this embodiment of this aspect of the present invention include the step of rinsing the hydride of lithiated nickel dioxide in water at a pH between about 7 and about 10. A lithiated nickel dioxide is obtained that is substantially free of LiOH and $Li_2CO_3$ by decanting the supernatant liquid and freeze-drying as disclosed in the parent application.

Another embodiment of this aspect of the present invention provides a method for preparing a hydride of lithiated nickel dioxide suitable for use as a cathode-active material that is substantially free of LiOH and $Li_2CO_3$. Processes in accordance with this embodiment of this aspect of the present invention also heat the intermediate mixture in an atmosphere substantially free of carbon dioxide; however, the atmosphere may or may not have a partial pressure of water vapor greater than about two torr.

The processes of this embodiment further include the step of rinsing the lithiated nickel dioxide in water at a pH between about 7 and about 10, which not only forms a hydride in which z has a value as great as about 0.3, but also removes any LiOH and $Li_2CO_3$ present, providing a cathode-active material with significantly reduced gas evolution upon charging.

Another embodiment of this aspect of the present invention provides a hydride of lithiated nickel dioxide suitable for use as a cathode-active material having a BET surface area less than about 3.0 $m^2/g$. Processes in accordance with this embodiment of this aspect of the present invention heat the intermediate mixture to temperatures above 650° C. However, when the mixture is heated to temperatures above about 700° C., the process further includes the step of reheating the mixture at a temperature between about 600° C. and about 700° C. in an atmosphere having a partial pressure of water vapor above about two torr to form the hydride, or, rinsing the resulting lithiated nickel dioxide in water at a pH between about 7 and about 10. As noted above, the decreased surface area of the resulting hydride of lithiated nickel dioxide improves the thermal stability of the cathode-active material by hindering the liberation of oxygen, that would otherwise oxidize the electrolyte when cells ar overheated from thermal or electrical abuse.

Further aspects of the present invention provide electrochemical cells incorporating the improved cathode-active materials of the present invention, made by the aforementioned methods. The electrochemical cells have a non-aqueous electrolyte of a lithium salt dissolved in an organic solvent. The anode used with the cathode-active material can be either a lithium metal anode or an intercalation electrode capable of reversibly incorporating lithium from the cathode-active material. Preferred cells according to these aspects of the invention provide superior energy storage capabilities both when fresh and after repeated cycling. When the cathode-active material is also substantially free of LiOH and $Li_2CO_3$, the superior energy storage capabilities are obtained after repeated cycling without an accumulation of gaseous products that lead to hazardous pressure buildup. The cells that incorporate low surface area cathode-active materials are also thermally stable and do not explode when subjected to temperature extremes such as welding of the cell casing or other forms of thermal or electrical abuse.

The foregoing and other objects, features and advantages of the present invention will be more readily understood from the detailed description of the preferred embodiment set forth hereinbelow, taken in conjunction with the accompanying drawings.

DETAILED DESCRIPTION OF THE PREFERRED EMBODIMENTS

Figure 1:
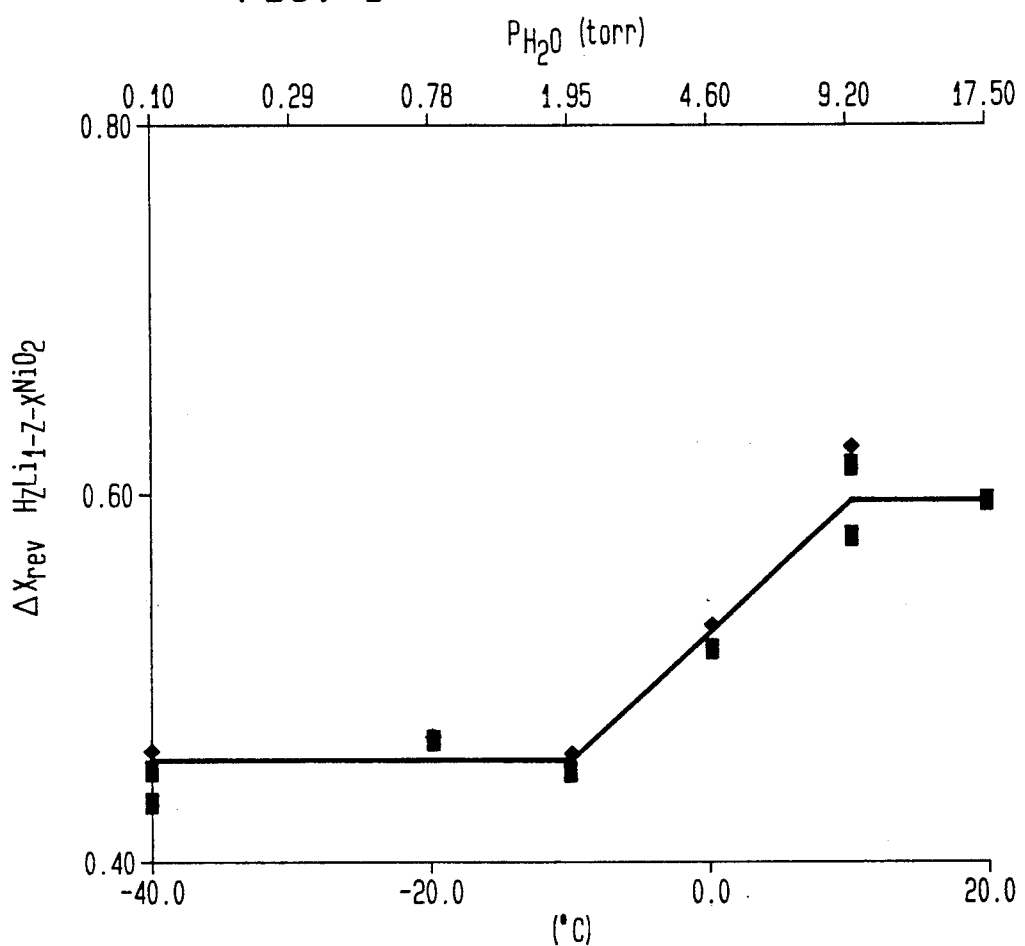
FIG. 1 depicts the effect of heat-treatment atmospheres containing water vapor upon the reversible capacity of $Li_{x-z}H_zNi_{2-x}O_2$.

A process according to one embodiment of the present invention provides for the preparation of a hydride of lithiated nickel dioxide having the formula $Li_{x-z}H_zNi_{2-x-y}M_yO_2$, wherein x is between about 0.8 and about 1.0, y is less than about 0.2, with the proviso that y is less than about 0.5 for cobalt, z is less than about 0.3 and M is one or more metals selected from iron, cobalt, chromium, titanium, manganese and vanadium. Even more preferred hydrides in accordance with the present invention have a value for x between 0.90 and about 1.00, a value for z between about 0.01 and about 0.05 and a value for y of about zero.

This process utilizes as a starting material either nickel oxide, (NiO), nickel hydroxide, ($Ni(OH)_2$) or mixtures thereof. The starting material may also optionally include one or more oxides or hydroxides of transition metals such as iron, cobalt, chromium, titanium, manganese and vanadium. The staring material employed in the present process desirably is in fine, particulate form, and most preferably has a mean particle size between about 1 micrometer and about 100 micrometers.

The parent application describes a process in which the starting material is combined with lithium hydroxide by contacting the starting material with a saturated aqueous solution of lithium hydroxide to form a slurry from which the water is evaporated so as to provide a substantially homogeneous intermediate mixture of lithium hydroxide and the starting material. Various techniques of evaporating water, such as spray-drying, are described that insure that each metal oxide or hydroxide particle receives a coating of lithium hydroxide. The simple mixing of dry lithium hydroxide and metal oxide or hydroxide powder is criticized as resulting in an intermediate mixture that is insufficiently homogeneous.

It has now been discovered, however, that the formation of a slurry followed by an evaporation step such as spray-drying is not critical, and that the metal oxide or hydroxide can be dry blended with lithium hydroxide. Preferably, the metal oxide or hydroxide is dry-mixed with lithium hydroxide powder. Because lithium hydroxide is a hydrate, the mixture is initially heated with agitation to between about 150° C. and 315° C. to cleave the hydrate, after which the mixture is heated with agitation so that the lithium hydroxide melts and coats the metal oxide or hydroxide. This is followed by cooling, grinding and remixing the blend, which is then reheated to initiate the reaction between the lithium hydroxide and the metal oxides. This will form either the lithiated nickel dioxide or hydride thereof, depending upon the partial pressure of water vapor in the heat treatment atmosphere.

The above-described method is easily adapted to high temperature fluid bed processing. However, the subsequent heating step in which the reaction is initiated between the lithium hydroxide and metal oxides can also be done in a static bed or a rotary calciner.

The quantity of lithium hydroxide and the metal oxides or hydroxides is selected so as to provide up to about 25% stoichiometric excess of lithium hydroxide over the metal oxides or hydroxides. Preferably, between about a 10% and about a 25% stoichiometric excess of lithium hydroxide is used. The substantially homogeneous intermediate mixture of lithium hydroxide and the metal oxides or hydroxides is then heat treated at an elevated temperature.

The partial pressure of water vapor of the atmosphere used in the heat-treatment step controls the hydrogen content of the hydride of lithiated nickel dioxide. Any partial pressure of water vapor greater than about two torr will result in the inclusion of hydrogen in the lithiated nickel dioxide crystal lattice. However, the amount of hydrogen, that is the value of z for $Li_{x-z}H_zNi_{2-x-y}M_yO_2$ does not significantly increase above about 0.02 for partial pressures of water vapor above about ten torr. Processes in which the partial pressure of water vapor is greater than ten torr are included within the process of the present invention because such partial pressures result in the production of the hydrides of lithiated nickel dioxide of the present invention.

The heat treatment of lithium hydroxide and nickel hydroxide or nickel oxide, however, generates significant water vapor that should be driven off together with any moisture present in the substantially homogeneous intermediate mixture. Otherwise, the reaction does not go to completion. Therefore, the atmosphere used in the heat-treatment step is preferably maintained at as low a partial pressure of water vapor as possible that will result in the formation of the hydride of lithiated nickel dioxide of the present invention. That is, the partial pressure of water vapor of the atmosphere in which the intermediate mixture is heated is preferably maintained between about two torr and about ten torr.

When the partial pressure of water vapor is maintained above about two torr, the hydride of lithiated nickel dioxide of the present invention is formed, which may contain a lithium hydroxide contaminant. However, the contaminant is converted to the electrochemically inert lithium oxide at temperatures above 650.C.

The conversion can be expressed as an equilibrium reaction involving the reaction of the transition metal oxides or hydroxides in the presence of water vapor as follows:

$$Li_xNi_{2-x}O_2 + zH_2O \rightleftharpoons Li_{x-z}H_zNi_{2-x}O_2 + zLiOH$$

At temperatures above 650° C., the lithium hydroxide is converted to lithium oxide:

$$z\,LiOH \rightleftharpoons \frac{z}{2} Li_2O + \frac{z}{2} H_2O$$

Thus, at partial pressures of water vapor below about ten torr and at temperatures above 650° C., the equilibrium between hydrogen in the lattice and hydrogen in water can be expressed as:

$$Li_xNi_{2-x}O_2 + \frac{z}{2} H_2O \rightleftharpoons Li_{x-z}H_zNi_{2-x}O_2 + \frac{z}{2} Li_2O$$

It is essential that the above reaction proceed to completion; otherwise, unreacted lithium hydroxide will remain as an impurity in the final product, where it decomposes at cell voltages with cycling to produce oxygen, hydrogen and hydrogen peroxide, if not removed. These predominantly gaseous products accumulate and lead to pressure buildup in cells. Thus, the above equilibrium should be maintained to favor the formation of the hydride of lithiated nickel dioxide over excess lithium hydroxide. This is accomplished by utilizing a partial pressure ratio of oxygen to water vapor above 15 in the atmosphere used in the heat treating step. This partial pressure ratio is preferably above about 30, and most preferably above about 80. As noted previously, because the partial pressure of oxygen in ambient air is about 160 torr, partial pressure ratios of oxygen to water vapor as great as 80 in ambient air will result in a partial pressure of water vapor in the heat treatment step atmosphere sufficient to result in the inclusion of hydrogen in the lithiated nickel dioxide crystal lattice.

The atmosphere used in the heat-treatment step may be oxidizing or inert. Strongly reducing atmospheres adversely affect the product. Oxidizing air is preferred, because at partial pressures of oxygen up to about 20% above ambient levels, and greater, it accelerates the reaction between lithium hydroxide and the metal oxide or hydroxide. Therefore, the partial pressure of oxygen in the heat-treatment atmosphere can be maintained above about 160 torr, with partial pressure ratios of oxygen to water vapor above about 80 preferred when the partial pressure of oxygen is above ambient levels.

The atmosphere used in this heat-treatment step should also be substantially free of carbon dioxide, because this gas can react with lithium hydroxide to form lithium carbonate, which is not heat-labile under these conditions. Any lithium carbonate formed would reduce the value of x in $Li_{x-z}H_zNi_{2-x-y}M_yO_2$ and remain as an impurity in the final product, where it would electrolytically decompose at cell voltages with cycling to produce oxygen and carbon dioxide, gaseous products that, as noted above, accumulate and cause a pressure buildup in the cells.

As noted above, the heat stability of the hydride of lithiated nickel dioxide increases as the BET surface area of the material decreases. The BET surface area of hydrides of lithiated nickel dioxides can be controlled by selection of the temperature at time at which the intermediate mixture is heat treated. As heat-treatment temperature is increased, the surface area of the material decreases and the heat stability increases.

For the hydride of the present invention obtained as a product of the within process, material made at 600° C. has a BET surface area between about 5 and about 10 $m^2/g$. Material made at 800° C. has a BET surface area of less than 1 $m^2/g$. For purposes of thermal stability, the hydride of lithiated nickel dioxide of the present invention obtained as a product of the within process desirably has a BET surface area of less than about 3 $m^2/g$. Preferably, the material has a BET surface area of less than about 2 $m^2/g$. Even more preferably, the material has a BET surface area of less than about 1 $m^2/g$.

While increasing the temperature of the heat-treatment step is beneficial because it lowers the BET surface area, as the temperature increases, the quantity of hydrogen introduced into the crystal lattice is reduced. This is further complicated by the discovery that the formation of the hydride is reversible and hydrogen can be removed from the lattice by reheating the hydride at a lower partial pressure of water vapor, or at a higher temperature. Hydrogen can be reintroduced by reheating at a higher partial pressure of water vapor or at a lower temperature. However, preferred processes in accordance with the present invention maximize both the reduction in BET surface area and the incorporation of hydrogen in the lattice by several methods.

One method heat treats the reaction mixture at temperatures between about 600° C. and about 700° C. to incorporate hydrogen into the lattice, but extends the heating time to increase the reduction in BET surface area. The extension of reaction time will vary with the quantity of hydride being produced, but can be readily determined by those of ordinary skill in the art from the within disclosure.

A second method first heats the reaction mixture at temperatures above 700° C. to maximize the reduction in BET surface area and then, because the formation of the hydride is reversible and temperature-dependent, reheats the reaction mixture at a temperature between about 600° C. and about 700° C. to increase the quantity of hydrogen introduced into the lattice. Still yet another method simply heats the reaction mixture at temperatures above 700° C. to reduce the BET surface area and then water-rinses the resulting lithiated nickel dioxide to introduce hydrogen into the crystal lattice.

The lithium carbonate content of the hydride of lithiated nickel dioxide at the end of the heat-treatment step depends upon the partial pressure of carbon dioxide maintained in the atmosphere used in the heat-treatment step. This partial pressure should be as low as practical so as to provide a substantially carbon dioxide-free atmosphere so that the hydride of lithiated nickel dioxide produced has a relatively low lithium carbonate content at the end of the heat-treatment step, and so that the reduction of x in $Li_{x-z}H_zNi_{2-x-y}M_yO_2$ is minimized. Thus, the partial pressure of carbon dioxide in the atmosphere used in the heat-treatment step is desirably below about 0.3 torr, preferably below about 0.1 torr and most preferably below about 0.05 torr.

The intermediate mixture is desirably held at the heat-treatment temperature for the time required for the complete reaction of the reactants and the inclusion of hydrogen in the crystal lattice, at least for about one-half hour and preferably for at least one hour. As temperatures increase, reaction time may be decreased.

The heat treatment of lithium hydroxide with nickel hydroxide or nickel oxide initially generates significant water vapor that should be driven off together with any moisture present in the substantially homogeneous intermediate mixture, to prevent the accumulation of excessive water vapor in the heat-treatment atmosphere. Preferably, any excessive water vapor generated is driven off by supplying the heat-treatment atmosphere with a substantially dry gas flow. The partial pressure of water vapor in this gas flow can then be increased as the water vapor generated by the reaction is reduced.

After the heat-treatment step in the atmosphere containing a partial pressure of water vapor greater than about two torr, any lithium carbonate formed, or any lithium hydroxide formed or remaining unreacted is removed from the lithiated nickel dioxide produced. Preferably, any lithium carbonate or lithium hydroxide present is removed by a controlled water rinse, because this process step can also be utilized to further incorporate hydrogen into the crystal lattice of the lithiated nickel dioxide to provide a value of z for hydrogen greater than about 0.02, up to about 0.3. Neutral water, or water having a basic pH should be used to prevent extraction of nickel. The pH of the rinse water is desirably between about 7 and about 10.

Because this rinsing step also inserts significant quantities of hydrogen into the lattice, it can function as an alternative and equally preferred method for preparing the hydride. That is, the hydride of lithiated nickel dioxide of the present invention can be prepared by water-rinsing lithiated nickel dioxide prepared in a substantially dry heat-treatment atmosphere that consequently has a substantially hydrogen-free crystal lattice.

Heating the rinse water further ensures the removal of lithium hydroxide and lithium carbonate from the hydrate of lithiated nickel dioxide and also results in the increased incorporation of hydrogen into the lithiated nickel dioxide crystal lattice. While the water rinse functions adequately at room temperature to remove lithium hydroxide and lithium carbonate and to insert hydrogen into the crystal lattice, water temperatures between about 20° C. and 100° C. are preferred for the insertion of hydrogen into the crystal lattice. While water temperatures above room temperature accelerate the insertion of hydrogen into the crystal lattice, the solubility of lithium carbonate in water decreases as water temperature increases. Therefore, water temperatures between 20° C. and 50° C. are more preferred.

The water and dissolved salts are separated from the hydride by filtration. Heating the filtrate results in the loss of hydrogen from the crystal lattice. Therefore, the filtrate is best dried by freeze-drying utilizing conventional freeze-drying methods.

The hydride of lithiated nickel dioxide obtained as a product of the within process has the formula $Li_{x-z}H_zNi_{2-x-y}M_yO_2$, with x being between about 0.8 and 1.0, and preferably between about 0.9 and 1.0. M is a transition metal selected from titanium, chromium, manganese, iron, cobalt and vanadium, and y is less than about 0.2 and preferably less than about 0.1, with the proviso that y is less than about 0.5 for cobalt and preferably less than about 0.25. The value of z is less than about 0.3.

The hydride is preferably substantially free of lithium hydroxide and lithium carbonate. The lithium hydroxide content of the hydride of lithiated nickel dioxide is preferably below about 20,000 ppm by weight, preferably below about 10,000 ppm, and most preferably below about 5,000 ppm. The lithium carbonate content of the hydride of lithiated nickel dioxide is also desirably below about 20,000 ppm by weight, preferably below about 10,000 ppm, and most preferably below about 5,000 ppm.

The hydrides of the present invention can be obtained by the processes of the present invention utilizing conventional processing equipment. For example, the process of the present invention is readily adaptable to agitated high temperature fluid bed methodology and processing equipment. Other stationary furnace systems such as static beds or rotary calciners can also be used.

Fluid bed processing is preferred, because the lithium hydroxide and metal oxide or hydroxide can be used without size reduction and the starting materials can be both mixed and reacted in the fluidized bed. The partial pressure of water vapor in both the fluidizing gas flow to the reactor and in the off-gas are readily monitored to accurately control the partial pressure of water vapor in the heat-treatment atmosphere. Furthermore, the fluidizing patterns in conjunction with the effect of the agitation enhances mixing, resulting in more intimate oxygen contact with the reacting material, more effective moisture removal, less agglomeration of product particles and shorter residence times.

An agitated fluid bed process in accordance with the present invention includes three phases. The starting materials are first dried by being charged into the unit in the proper stoichiometric ratio, with the lithium hydroxide hydrate added first. The mixture is immediately fluidized by dry air having a dew point less than $-20°$ C. entering through a bottom distributor plate via a plenum. The fluidizing gas velocity is maintained at 2.7 to 5.5 actual meters per minute and operates simultaneously with a low speed (5 to 40 rpm) "raking" device or agitator. The material or bed temperature is maintained between 150° C. and 315° C. for 1½ to 3 hours. This completes the bulk moisture removal which occurs with clearage of water from lithium hydroxide hydrate.

In the second phase, agitation and fluidization continues as in the first phase and the material temperature is raised to 650° C. to 700° C. in a period of approximately one hour. The reaction is initiated at 465° C. to 475° C. when the lithium hydroxide melts, coats and interacts with the metal oxide or hydroxide component. The minimum reaction period is eight hours and a dew point of 0° to 10° C. measured in the off-gas is used to indicate the transition to the third phase.

In the third phase, agitation and fluidization continue as in the first two phases. The temperature of the material is maintained between about 650° C. and 700° C. The partial pressure of water vapor in the system is maintained between about two and about ten torr for a period of about 1 to about 4 hours to stabilize the product structure and incorporate hydrogen into the lattice.

The resulting hydride is qualified by examination of the x-ray diffraction pattern and determination of the reversible capacity (greater than about 138 mAh/g) by the thin segment electrode method.

The relationship of cycling capacity of $Li_{x-z}H_zNi_{2-x}O_2$ to the dew point, or partial pressure of water vapor, in the atmosphere in which it was synthesized is shown in FIG. 1, which depicts the chan in reversible capacity, in $Li_{x-z}H_zNi_{2-x}O_2$ versus dew point. As the dew point or partial pressure of water vapor in torr of the atmosphere in which the hydride of lithiated nickel dioxide was heat treated increased, the value of z for hydrogen also increased, up to a partial pressure of water vapor of about ten torr. For partial pressures of water vapor in the heat-treatment atmosphere between about two and about ten torr, the capacity of the cell steadily increases. This is more graphically illustrated in FIGS. 2 and 3, which depict hydrides of lithiated nickel dioxide produced in heat-treatment atmospheres having dew points of $-20°$ C. and 10° C., respectively. The hydride of lithiated nickel dioxide produced in a heat-treatment atmosphere having a dew point of 10° C. (a partial pressure of water vapor of about 9.2 torr) had a significantly greater reversible capacity than the hydride of lithiated nickel dioxide produced in a heat-treatment atmosphere having a dew point less than $-20°$ C. (less than 0.78 torr).

The hydride of lithiated nickel dioxide of the present invention, obtained as a product of the within processes, can be fabricated into a cathode structure by the techniques utilized with other particulate cathode-active materials. Thus, the lithiated nickel dioxide of the present invention may be suspended in a volatile liquid carrier together with a polymeric binder such as polyethylene oxide, polytetrafluoroethylene or other fluoropolymers or a polymer of ethylene propylene diene monomer, commonly referred to as EPDM. The suspension may be coated onto a suitable backing such as a metallic current collector foil, and the solvent may be evaporated so as to set the binder and provide a coherent layer of cathode-active material on the binder. Desirably, a chemically inert, particulate electrically conductive material such as carbon black is incorporated in the suspension and hence, interspersed with active material of the cathode structure in the conventional manner.

The cathode may be assembled in the conventional manner with an anode capable of intercalating lithium ions and with an electrolyte incorporating lithium ions to form a cell. Lithium metal anodes are suitable for use with the present invention. The preferred anode, however, is a particulate intercalation anode as disclosed by the above-cited co-pending U.S. patent application No. 350,396, the disclosure of which is hereby incorporated herein by reference thereto. Preferably, the amount of lithium present in the hydride of lithiated nickel dioxide is that quantity sufficient to saturate the anode upon charging of the cell. Thus, preferred cells according to the present invention will contain a cathode fabricated from the hydride of the present invention, and an intercalation anode each capable of reversibly intercalating lithium ions, and an electrolyte with which the cathode and anode are in mutual contact. Preferred materials for the intercalation anode include carbonaceous materials such as graphitic carbons, preferably poorly graphitic carbons. Preferred poorly graphitic carbons include coke, more preferably petroleum coke.

Merely by way of example, the electrolyte may be a solution of a lithium salt in a non-aqueous liquid solvent. Suitable lithium salts include $LiAsF_6$, $LiPF_6$, $LiBF_4$, $LiAlCl_4$, $LiCF_3CO_2$, $LiCF_3SO_3$, $LiN(CF_3SO_2)_2$ and mixtures thereof. $LiPF_6$, $LiAsF_6$, $LiN(CF_3SO_3)_2$ and mixtures thereof are preferred. Suitable electrolyte solvents include organic solvents such as propylene carbonate, ethylene carbonate and mixtures thereof, with or without additional ingredients such as tetrahydrofuran, 2-methyl tetrahydrofuran, dimethoxyethane, sulfolane, dimethylcarbonate, diethylcarbonate and one or more glymes. Concentrations of the electrolyte salts in the electrolyte solution of the present invention are preferably between about 0.5 molar and about 1.5 molar, and are most preferably about 1.0 molar. When a lithium metal counterelectrode is used, the counterelectrode may be essentially pure lithium metal or may include an alloy of lithium with another metal such as aluminum, and the cell preferably incorporates means for applying pressure on the lithium counterelectrode at least during recharge, as disclosed in Canadian Patent No. 1,190,279, the disclosure of which is hereby incorporated herein by reference thereto.

The hydride of lithiated nickel dioxide of the present invention thus provides a cathode-active material having an increased reversible capacity without sacrificing thermal stability or freedom from gas evolution during repeated cycling, and therefore represents an improvement over the thermally stable lithiated nickel dioxides of the prior art that are also free from gas evolution during repeated cycling. The cathode-active materials of the present invention also provide an air-stable source of lithium for cells that have lithium-intercalable anodes instead of metallic lithium anodes. This simplifies cell design and manufacture because it is no longer necessary to design cells to accommodate temporary lithium anodes, nor is it necessary any longer to handle such electrodes.

The following, non-limiting examples set forth hereinbelow illustrate certain aspects of the present invention. They are not to be considered limiting as to the scope and nature of the present invention.

EXAMPLES

EXAMPLES 1-3

1,488 g NiO powder having an average particle size of about ten microns was hand mixed with 918 g finely ground $LiOH \cdot H_2O$ to form a mixture that was heated for five hours at 650° C. in a conventional oven. The mixture was cooled and reground with a mortar and pestle, and further heated for twelve hours at 650° C. in a tube furnace under a flow of $CO_2$-free air. The dew point of the exhaust from the tube furnace was monitored and did not drop below 20° C. This heat-treated mixture, containing a hydride of lithiated nickel dioxide was then removed from the oven and allowed to cooled. An 8 g portion of this large batch was then reheated for an additional 32 hours at 650° C. in a tube furnace under a 0.2 slpm flow of $CO_2$- free air. For the first 16 hours, the dew point of the inlet air was controlled at 10° C., and for the final 16 hours, dry air with a dew point below $-40°$ C. was used. A third sample was prepared by reheating a 20 g portion of the large batch for 32 hours at 650° C. in the same tube furnace under a 0.4 slpm flow of $CO_2$-free air. The dew point of the inlet air was controlled at 10° C., and the dew point of exhaust from the tube was verified to be 10° C.

Cathodes were prepared from each of these three samples by coating slurries of 100 parts of the hydride of lithiated nickel dioxide, 10 parts Ensagri SuperS carbon black and 2 parts ethylene propylene diene terpolymer (EPDM) dissolved in cyclohexane onto aluminum foil to give a coating of approximately 20 mg/cm$^2$. Two test cells of each sample were prepared. The test cells contained 1.14 cm$\times$1.14 cm squares of lithium metal and the cathode separated by a microporous polypropylene separator, all wetted with 1 M $LiAsF_6$ in a solvent blend of equal volumes of ethylene carbonate and propylene carbonate. The cell components were sealed in conventional coin cell hardware used for primary lithium cells.

The cells were cycled at constant current between 3 and 4.1 volts. The current was chosen so that half of the lithium would be transferred in 20 hours (dx=0.5 in $Li_{1-x-z}H_zNiO_2$). The reversible capacity of the cathode active material is given as dx in $Li_{1-x-z}H_zNiO_2$, and is determined from the charge transfer and the mass of the active material in the cell.

Figure 2:
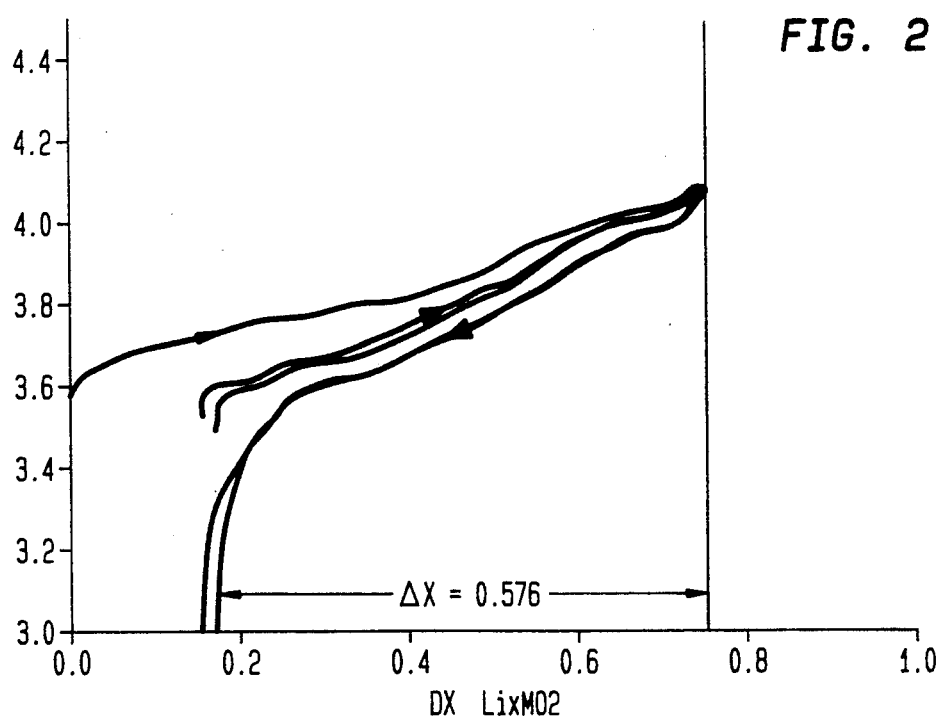
FIG. 2 shows constant current charge-discharge cycles depicting the reversible capacity of a cell assembled using a hydride of lithiated nickel dioxide heat treated in an atmosphere having a dew point of 20° C.
Figure 3:
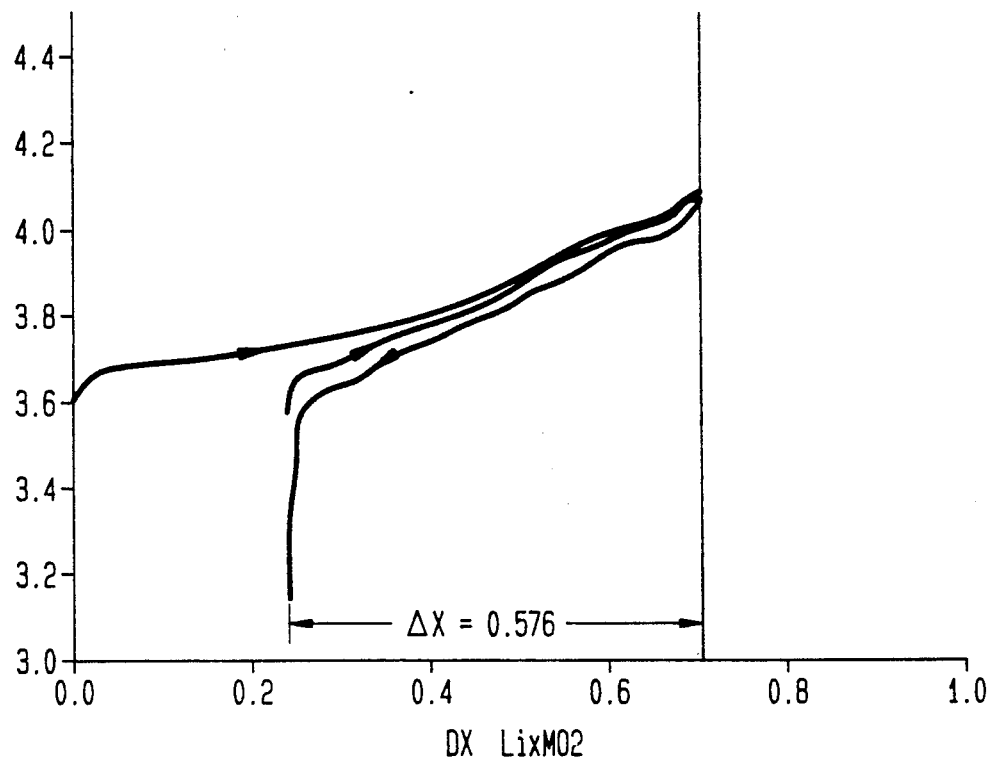
FIG. 3 shows constant current charge-discharge cycles depicting the reversible capacity of a cell assembled using a hydride of lithiated nickel dioxide heat treated in an atmosphere having a dew point less than $-40°$ C.
Figure 4:
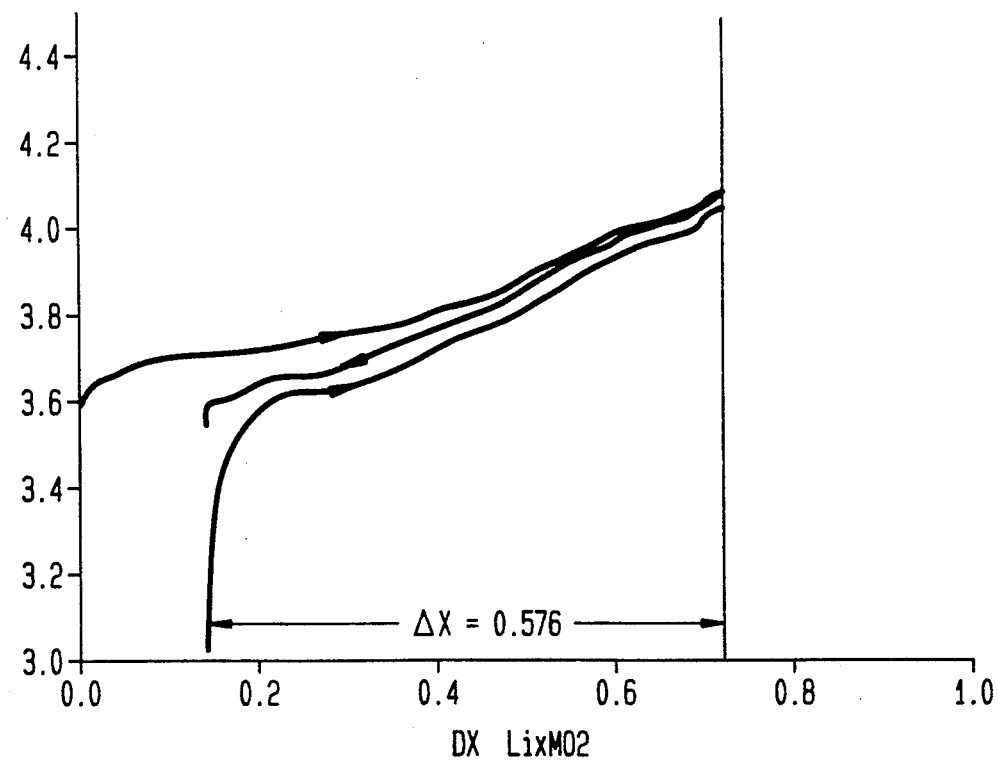
FIG. 4 shows constant current charge-discharge cycles the reversible capacity of a cell assembled using a hydride of lithiated nickel dioxide heat treated in an atmosphere having a dew point of 10° C.

Voltage curves depicting the constant current charge-discharge cycling of the cells containing the three materials are depicted in FIGS. 2-4. It is noteworthy that the dx for the initial charge is about 0.7, for all three materials; that is, it is essentially the same regardless of the heat treatment used. However, not all of this lithium is replaced when the cell is discharged to 3 volts. The reversible capacity between 3 and 4.1 volts varies considerably depending upon the sample history.

FIG. 2 depicts the reversible capacity of the sample heated at a dew point of 20° C., FIG. 3 depicts the reversible capacity of the material first heated under a dew point of 20° C., further heated at a dew point of 10° C., and then finally heated with dry air having a dew point below $-40°$ C. FIG. 4 depicts the reversible capacity of the sample that was first heated at a dew point of 20° C. and then reheated at a dew point of 10° C. As shown in these figures, the reversible capacity of the hydride of lithiated nickel dioxide drops from about dx=0.57 to about dx=0.47 when the material is reheated under dry air, but remains unchanged when the material is reheated under humid air having a dew point of 10° C.

Aside from the improved reversible capacity in the materials heated with the higher dew point air, no measurable change in physical properties, such as surface area, particle size or crystal structure were found. All three samples had x-ray diffraction patterns characteristic of essentially stoichiometric hydride of lithiated nickel dioxide, with traces of lithium hydroxide, lithium oxide and lithium carbonate impurities. The x-ray diffraction patterns of the hydride of lithiated nickel dioxide phases were indistinguishable to within experimental uncertainty.

Proton nuclear magnetic resonance, (NMR) was used to determine the hydrogen content (z in $Li_{1-x-z}H_zNiO_2$) of the second and third samples. Unlike other forms of chemical analysis, proton NMR is sensitive to small concentrations of hydrogen and can distinguish between hydrogen atoms in different chemical environments. The proton NMR analysis showed that the sample reheated in extra dry air having a dew point below $-40°$ C. had a value for z of 0.00, whereas the third sample that was reheated in a humid atmosphere having a dew point of 10° C. gave a value for z equal to 0.03. The higher value of z corresponds to the material with higher reversible capacity. This demonstrates that an ion-exchange reaction between water vapor and lithiated nickel dioxide results in the substitution of some hydrogen for lithium in the lattice, and that this in turn improves the reversible capacity of the material.

Samples were also prepared having lithium hydroxide contaminants. The contaminated material was analyzed using proton NMR. The NMR analysis showed that the lithium hydroxide contaminant altered peaks not associated with hydrogen in the material, confirming that the peaks obtained for the pure material corresponded to hydrogen in the crystal lattice of the lithiated nickel hydroxide.

EXAMPLES 4-9

120 g of NiO powder having an average particle size of about 10 microns was mixed with 81 g of finely ground $LiOH \cdot H_2O$ to form a mixture that was then heated for two hours at 650° C. in a conventional oven under $CO_2$-free dry air. The product was cooled and ground with a mortar and pestle, and then six 20 g portions of this material were reheated at tube furnace under 0.2 slpm flow of $CO_2$-free air at controlled dew points of $-40°$ C., $-20°$ C., $-10°$ C., 0, 10° C. and 20° C., respectively.

Cathodes and cells were prepared as detailed in Examples 1-3. The reversible capacity of each sample was determined by cycling the cells as in Examples 1-3. The reversible capacity of each sample compared to the dew point at which it was heated is depicted in FIG. 1. As shown in FIG. 1, the reversible capacity varies from about $dx=0.45$ for samples heated at dew points less than or equal to $-10°$ C. to about $dx=0.6$ for samples heated at dew points greater than or equal to 10° C. Increasing the water vapor pressure above nine torr (a dew point equal to 10° C.) does not appear to increase the reversible capacity any further.

The foregoing description of the preferred embodiment should be taken as illustrating, rather than as limiting the present invention as defined by the claims. Numerous variations and combinations of the features described above can be utilized without departing from the present invention.

What is claimed is:

1. A hydride of lithiated nickel dioxide cathode-active material for an electrochemical cell, having a stoichiometric formula $Li_{x-z}H_zNi_{2-x-y}M_yO_2$, wherein x is between about 0.80 and about 1.00, M is one or more metals selected from the group consisting of cobalt, iron, chromium, titanium, manganese and vanadium, y is less than about 0.2, with the proviso that y is less than about 0.5 for cobalt, and z is less than about 0.3.

2. The cathode-active material of claim 1, having the stoichiometric formula $Li_{x-z}H_zNi_xO_2$, wherein x is between about 0.80 and about 1.00.

3. The cathode-active material of claim 2, wherein x is between about 0.90 and about 1.00.

4. The cathode-active material of claim 1, wherein said material is substantially free of lithium hydroxide or lithium carbonate.

5. The cathode-active material of claim 4, having a lithium carbonate content less than about 20,000 ppm by weight.

6. The cathode-active material of claim 5, having a lithium carbonate content less than about 10,000 ppm.

7. The cathode-active material of claim 6, having a lithium carbonate content less than about 5,000 ppm.

8. The cathode-active material of claim 4, having a lithium hydroxide content less than about 20,000 ppm by weight.

9. The cathode-active material of claim 8, having a lithium hydroxide content less than about 10,000 ppm.

10. The cathode-active material of claim 9, having a lithium hydroxide content less than about 5,000 ppm.

11. The cathode-active material of claim 1, having a BET surface area of less than about 3.0 $m^2/g$.

12. The cathode-active material of claim 11, having a BET surface area of less than about 2.0 $m^2/g$.

13. The cathode-active material of claim 12, having a BET surface area of less than about 1.0 $m^2/g$.

14. An electrochemical cell comprising a cathode containing the cathode-active material as claimed in claim 1, an electrolyte and an anode capable of intercalating lithium.

15. The electrochemical cell of claim 14, wherein said counterelectrode capable of intercalating lithium comprises carbonaceous materials.

16. The electrochemical cell of claim 15, wherein said carbonaceous materials comprise graphitic carbon.

17. The electrochemical cell of claim 16, wherein said carbon is poorly graphitic.

18. The electrochemical cell of claim 17, wherein said poorly graphitic carbon comprises coke.

19. The electrochemical cell of claim 18, wherein said coke comprises petroleum coke.

20. An electrochemical cell comprising an anode comprising lithium, an electrolyte and a cathode containing the cathode-active material as claimed in claim 1.

21. A method of making a hydride of lithiated nickel dioxide suitable for use as a cathode-active material in an electrochemical cell, said method comprising the steps of:

providing a substantially homogeneous dry intermediate mixture of a starting material comprising a nickel compound selected from the group consisting of nickel oxide, nickel hydroxide and mixtures thereof, together with up to about a 25% stoichiometric excess of lithium hydroxide; and heat treating said mixture at a temperature between about 600° and about 700° C. in an atmosphere having a partial pressure of water vapor greater than about two torr.

22. A method as claimed in claim 21, wherein said starting material further comprises one or more oxides or hydroxides of a transition metal selected from the group consisting of cobalt, iron, titanium, manganese, chromium and vanadium.

23. A method as claimed in claim 21, wherein said heat-treating step is conducted for at least one-half hour.

24. A method as claimed in claim 23, wherein said heat-treating step is conducted for at least one hour.

25. A method as claimed in claim 21, wherein said atmosphere is substantially free of carbon dioxide.

26. A method as claimed in claim 25, wherein the partial pressure of said carbon dioxide in said atmosphere is less than about 0.3 torr.

27. A method as claimed in claim 26, wherein said partial pressure of said carbon dioxide in said atmosphere is less than about 0.1 torr.

28. A method as claimed in claim 27, wherein said partial pressure of said carbon dioxide in said atmosphere is less than about 0.05 torr.

29. A method as claimed in claim 21, wherein the partial pressure ratio of oxygen to water vapor in said atmosphere is greater than about 15.

30. A method as claimed in claim 21, wherein the partial pressure of oxygen in said atmosphere is greater than ambient levels.

31. A method as claimed in claim 21, wherein said heat-treating step is a second heat-treating step and said method further comprises a first heat-treating step comprising heat treating said mixture at a temperature above about 600° C. in an atmosphere having a partial pressure of water vapor less than about two torr.

32. The method of claim 31, wherein said partial pressure of said water vapor in said atmosphere is less than about one torr.

33. A method as claimed in claim 32, wherein said partial pressure of said water vapor in said atmosphere is less than about 0.5 torr.

34. A method as claimed in claim 31, wherein said atmosphere of said heat-treating step is substantially free of carbon dioxide.

35. A method as claimed in claim 21, further comprising the steps of rinsing said mixture with water and recovering said mixture.

36. A method as claimed in claim 35, wherein said recovering step comprises filtering said water from said mixture.

37. A method as claimed in claim 36, further comprising the step of drying said mixture after said filtering step.

38. A method as claimed in claim 37, wherein said drying step comprises freeze-drying said filtered mixture.

39. A method as claimed in claim 35, wherein said water has a pH between about 7 and about 10.

40. A method as claimed in claim 35, wherein said water is at a temperature between about 20° and about 100° C.

41. A method as claimed in claim 40, wherein said water is at room temperature.

42. A method of making a hydride of lithiated nickel dioxide suitable for use as a cathode-active material in an electrochemical cell, said method comprising rinsing with water lithiated nickel dioxide having the formula $Li_{x-z}H_zNi_{2-x-y}M_yO_2$ wherein x is between about 0.80 and about 1.00, M is one or more metals selected from the group consisting of cobalt, iron, chromium, titanium, manganese and vanadium, y is less than about 0.2, with the proviso that y is less than bout 0.5 for cobalt, and z is less than about 0.30, and recovering said rinsed lithiated nickel dioxide.

43. The method of claim 42, wherein said recovering step comprises filtering said water from said lithiated nickel dioxide.

44. The method of claim 43, further comprising the step of drying said mixture after said filtering step.

45. A method as claimed in claim 44, wherein said drying step comprises freeze-drying said filtered mixture.

46. A method as claimed in claim 42, wherein said water has a pH between about 7 and about 10.

47. A method as claimed in claim 42, wherein said water is at a temperature between about 20° and about 100° C.

48. A method as claimed in claim 47, wherein said water is at room temperature.

49. A method as claimed in claim 42, wherein said lithiated nickel dioxide is prepared by heat treating a substantially homogeneous dry intermediate mixture of a starting material comprising a nickel compound selected from the group consisting of nickel oxide, nickel hydroxide and mixtures thereof, together with up to about a 25% stoichiometric excess of lithium hydroxide at a temperature above about 600° C. in an atmosphere having a partial pressure of water vapor less than about two torr.

50. A method as claimed in claim 49, wherein said partial pressure of said water vapor in said atmosphere is less than about one torr.

51. A method as claimed in claim 50, wherein said partial pressure of said water vapor in said atmosphere is less than about 0.5 torr.

52. A method as claimed in claim 49, wherein said atmosphere of said heat-treating step is substantially free of carbon dioxide.

53. A method as claimed in claim 49, wherein said starting material further comprises one or more oxides or hydroxides of a transition metal selected from the group consisting of cobalt, iron, titanium, manganese, chromium and vanadium.

54. A method as claimed in claim 49, wherein said heat-treating step is a first heat-treating step and said method further comprises a second heat-treating step comprising heat-treating said mixture at a temperature between about 600° and about 700° C. in an atmosphere having a partial pressure of water vapor greater than about two torr.

55. A method as claimed in claim 54, wherein said atmosphere is substantially free of carbon dioxide.

56. A method as claimed in claim 55, wherein the partial pressure of said carbon dioxide in said atmosphere is less than about 0.3 torr.

57. A method as claimed in claim 56, wherein said partial pressure of said carbon dioxide in said atmosphere is less than about 0.1 torr.

58. A method as claimed in claim 57, wherein said partial pressure of said carbon dioxide in said atmosphere is less than about 0.05 torr.

59. A method as claimed in claim 58, wherein the partial pressure ratio of oxygen to water vapor in said atmosphere is greater than about 15.

60. A method as claimed in claim 42, wherein the partial pressure of oxygen in said atmosphere is greater than ambient levels.

61. A method as claimed in claim 42, wherein said lithiated nickel dioxide is prepared by heat treating a substantially homogeneous dry intermediate mixture of a starting material comprising a nickel compound selected from the group consisting of nickel oxide, nickel hydroxide and mixtures thereof, together with up to about a 25% stoichiometric excess of lithium hydroxide at a temperature between about 600° and about 700° C. in an atmosphere having a partial pressure of water vapor greater than about two torr.

62. A method as claimed in claim 61, wherein said starting material further comprises one or more oxides or hydroxides of a transition metal selected from the group consisting of cobalt, iron, titanium, manganese, chromium and vanadium.

63. A method as claimed in claim 61 wherein said atmosphere is substantially free of carbon dioxide.

64. A method as claimed in claim 63, wherein the partial pressure of said carbon dioxide in said atmosphere is less than about 0.3 torr.

65. A method as claimed in claim 64, wherein said partial pressure of said carbon dioxide in said atmosphere is less than about 0.1 torr.

66. A method as claimed in claim 65, wherein said partial pressure of said carbon dioxide in said atmosphere is less than about 0.05 torr.

67. A method as claimed in claim 61, wherein the partial pressure ratio of oxygen to water vapor in said atmosphere is greater than about 15.

68. A method as claimed in claim 61, wherein the partial pressure of oxygen in said atmosphere is greater than ambient levels.

* * * * *

UNITED STATES PATENT AND TRADEMARK OFFICE
CERTIFICATE OF CORRECTION

PATENT NO. : 5,180,574
DATED     : January 19, 1993
INVENTOR(S) : Ulrich Von Sacken It is certified that error appears in the above-identified patent and that said Letters Patent is hereby corrected as shown below:

On the title page, under the heading "Related U.S. Application Data" "Continuation-in-part of Ser. No. 556,764" should read --Continuation-in-part of Ser. No. 556,754--.

Column 8, line 25, "an,,.atmosphere" should read --an atmosphere--.

Column 8, lines 30-31, "charge-discharge cycles the" should read --charge-discharge cycles depicting the--.

Column 17, line 42, "$Li_{x-z}H_zNi_xO_2$" should read --$Li_{x-z}H_zNi_{2-x}O_2$--

Signed and Sealed this

Twenty-third Day of November, 1993

Attest:

BRUCE LEHMAN

Attesting Officer    Commissioner of Patents and Trademarks